US011434991B2

(12) United States Patent
Mendoza-Vega et al.

(10) Patent No.: US 11,434,991 B2
(45) Date of Patent: Sep. 6, 2022

(54) SHIFT-BY-WIRE (SBW) COLUMN SHIFTER (71) Applicant: Ficosa North America Corporation, Madison Heights, MI (US)

(72) Inventors: Alejandro Mendoza-Vega, Rochester Hills, MI (US); Javier Alvarez Rubio, Rochester Hills, MI (US)

(73) Assignee: Ficosa North America Corporation, Madison Heights, MI (US)

( * ) Notice: Subject to any disclaimer, the term of this patent is extended or adjusted under 35 U.S.C. 154(b) by 0 days.

(21) Appl. No.: 17/120,677

(22) Filed: Dec. 14, 2020

(65) Prior Publication Data

US 2021/0095756 A1 Apr. 1, 2021

Related U.S. Application Data (63) Continuation-in-part of application No. 16/147,960, filed on Oct. 1, 2018, now Pat. No. 10,962,108.

(51) Int. Cl.
*B60K 17/04* (2006.01)
*B60K 17/12* (2006.01)
*F16H 59/10* (2006.01)
*B60K 20/06* (2006.01)

(52) U.S. Cl.
CPC ........... *F16H 59/105* (2013.01); *B60K 20/06* (2013.01)

(58) Field of Classification Search
CPC ......... F16H 2061/247; F16H 2061/243; F16H 2059/026; F16H 59/105; F16H 61/24; F16H 59/0204; B60K 20/06
See application file for complete search history.

(56) References Cited

U.S. PATENT DOCUMENTS

| 4,537,088 | A | 8/1985 | Kubota |
| 5,307,013 | A | 4/1994 | Santos et al. |
| 6,209,408 | B1 * | 4/2001 | DeJonge ............... F16H 59/044 74/335 |
| 6,699,155 | B2 | 3/2004 | Nagasaka |
| 6,834,563 | B2 | 12/2004 | Seekircher |
| 7,832,302 | B2 * | 11/2010 | Wang ...................... F16H 61/22 74/473.23 |
| 8,075,447 | B2 | 12/2011 | Hori et al. |
| 8,760,152 | B2 * | 6/2014 | Uhlenbruck .......... F16H 59/105 324/207.2 |
| 10,281,028 | B2 | 5/2019 | Recio et al. |
| 2004/0035237 | A1 | 2/2004 | Matsui et al. |
| 2005/0056109 | A1 | 3/2005 | Kim |
| 2007/0193385 | A1 | 8/2007 | Hermansson et al. |

(Continued)

FOREIGN PATENT DOCUMENTS

| JP | 2007071370 A | 3/2007 |
| JP | 2008105650 A | 5/2008 |
| KR | 20050023143 A | 3/2005 |

*Primary Examiner* — Jake Cook
(74) *Attorney, Agent, or Firm* — Brooks Kushman P.C.

(57) ABSTRACT

A shift-by-wire (SBW) column shifter for a vehicle includes a shift lever configured to be moved to shift gears. A shaft enables the shift lever to rotate the shaft about an axis. A lever detent is coupled to the shaft, enabling the shaft to rotate the lever detent about the axis. A rotatable magnet rotates as the lever detent rotates. A magnetic sensor senses the angular position of the lever detent due to the changes in magnetic characteristics of the magnet as it rotates. A processor can command an operating gear change based on the signal output from the magnet sensor.

17 Claims, 9 Drawing Sheets

(56) References Cited

U.S. PATENT DOCUMENTS

| | | |
|---|---|---|
| 2010/0071506 A1 | 3/2010 | Kliemannel et al. |
| 2011/0025308 A1 | 2/2011 | Kitanaka et al. |
| 2012/0000309 A1 | 1/2012 | Takagi et al. |
| 2012/0285284 A1 | 11/2012 | Wang |
| 2014/0174233 A1 | 6/2014 | Giefer et al. |
| 2018/0283543 A1 | 10/2018 | Cha |
| 2019/0128404 A1 | 5/2019 | Morales et al. |

\* cited by examiner

SHIFT-BY-WIRE (SBW) COLUMN SHIFTER

CROSS-REFERENCE TO RELATED APPLICATIONS

This application is a continuation-in-part, and claims prior to, U.S. patent application Ser. No. 16/147,960 filed Oct. 1, 2018, now U.S. Pat. No. 10,962,108, issued Mar. 30, 2021, the disclosure of which is hereby incorporated in its entirety by reference herein.

TECHNICAL FIELD

This disclosure is directed to shift-by-wire (SBW) column shifter for an automobile. In particular, the column shifter includes a shifter lever for shifting between gears (e.g., park, reverse, neutral, drive, etc.), wherein movement of the shifter lever electronically actuates the gear shift.

BACKGROUND

Vehicles having an automatic transmission typically include a shift control lever or a shifter mounted on a dashboard, a console, or the steering column of the vehicle. An operator of the vehicle may manually move the shifter between designated positions to change the gear position in which the transmission is commanded to operate. These gear positions include Park, Reverse, Neutral, Drive, and sometimes others, such as Low. The shifter is therefore commonly referred to by its acronym—a PRNDL or PRND shift mechanism.

Shift-by-wire (SBW) systems are known. In SBW systems, movement of the shift control lever causes electronic signals to be sent to a controller, which correspondingly electronically commands a change in the operating gear of the vehicle.

SUMMARY

In an embodiment, a shift-by-wire (SBW) column shifter is configured to mount to or within a steering column of a vehicle. The SBW column shifter includes a shift lever configured to be moved to shift gears; a shaft coupled to the shift lever to enable the shift lever to rotate the shaft about an axis; a lever detent coupled to the shaft to enable the shaft to rotate the lever detent about the axis; a magnet configured to rotate about the axis as the shift lever is moved between gears; and a sensor configured to output signals indicating an angular position of the slider magnet, wherein the signals are indicative of a command to change an operating gear of the vehicle.

In another embodiment, a SBW column shifter includes a housing; a lever detent rotatable within the housing in response to a shift lever moving to command a gear shift, the lever detent having an outer surface with a plurality of ramped surfaces leading to respective grooves therebetween; a spring mounted to the housing, the spring having a free end biased against the outer surface of the lever detent, wherein the free end slides along the ramped surfaces and presses into the grooves as the lever detent rotates during the gear shift; and a controller programmed to command a change in an operating gear as the lever detent rotates, wherein each of the grooves is associated with a respective one of the operating gears.

In another embodiment, a SBW system includes a lever detent rotatable about an axis in response to a shift lever moving to command a gear shift, the lever detent having an outer surface defining a plurality of ramped surfaces leading to respective grooves therebetween, the lever detent further having a main body with a projection extending therefrom at a location offset from the axis; a spring having a free end engaging the outer surface of the lever detent, the spring configured to slide along the ramped surfaces and mate within the grooves as the lever detent rotates to provide a force feedback to an operator during shifting; a cap secured to an outer surface of the lever detent; a magnet secured to the cap and rotatable about the axis as the lever detent rotates about the axis; a sensor fixed along the axis and spaced from the magnet, the sensor configured to output a signal that changes in response to rotation of the magnet; and a controller coupled to the sensor and programmed to command the gear shift in response to a change in the signal.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
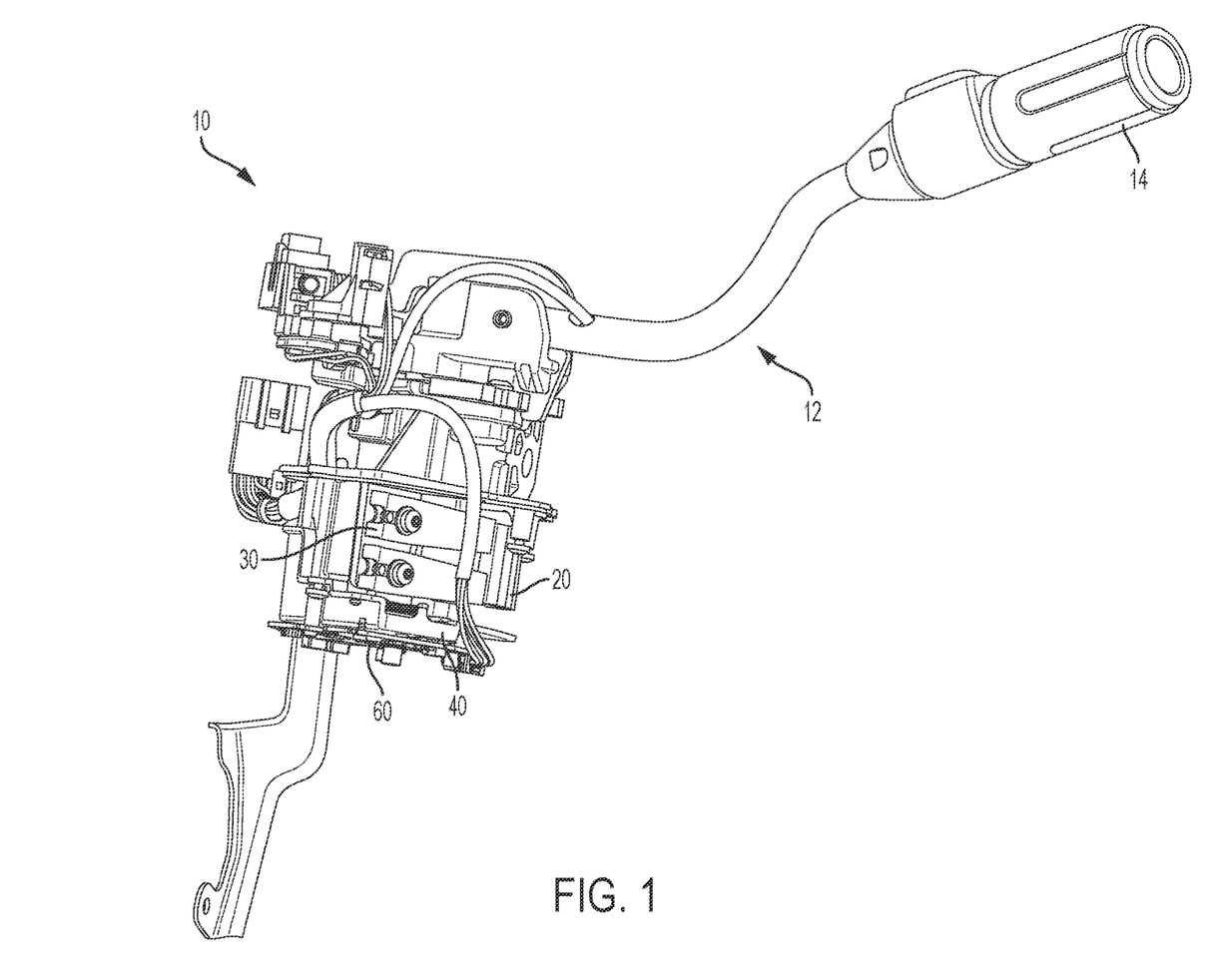
FIG. 1 is a perspective view of a shift-by-wire (SBW) column shifter, according to one embodiment.

FIG. 1 shows a perspective view of a shift-by-wire (SBW) column shifter 10, according to one embodiment. An outer housing is removed for clarity of the internal components. The SBW column shifter 10 is configured to mount to or within a steering column of a vehicle, such as a pickup truck, car, van, sports utility vehicle (SUV), etc. The shifter 10 includes a shift lever 12 ending in a handle 14 extending outward from the housing and the steering column. In operation, an operator of the vehicle grabs the handle 14 and rotates the lever 12 to command a shift in the PRNDL operating gear of the vehicle (e.g., Park, Reverse, Neutral, Drive, Low, etc.).

Movement of the lever 12 causes mechanical movement within the SBW column shifter 10 that causes a corresponding electronic ("by-wire") shift in the operating gear. The structure and function associated with the change in operating gear during an electronic shift will be described below with respect to the remaining Figures. Some main components that will be described include a lever detent 20, leaf springs 30, a slider magnet 40, and a printed circuit assembly 60 having a plurality of sensors and a corresponding controller.

Referring to FIGS. 2-6, rotation of the shift lever 12 rotates a connected shaft 16 about its central longitudinal axis. The shaft 16 couples to the lever detent 20. In one embodiment, the lever detent 20 has a main body 21 defining an aperture 22 therethrough, and the shaft 16 couples to the lever detent 20 through the aperture 22. Rotation of the shaft 16 correspondingly rotates the connected lever detent 20. Rotation of the lever detent 20 causes the slider magnet 40 to slide linearly, as will be described below.

Figure 3:
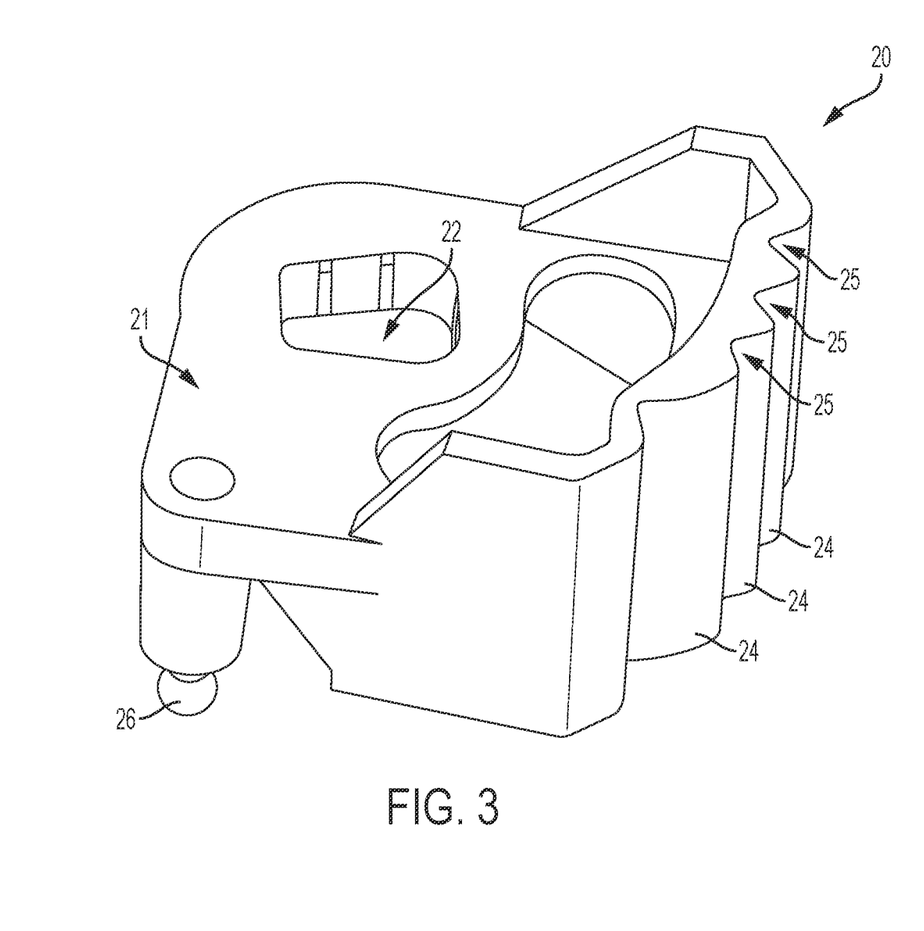
FIG. 3 is a perspective view of the lever detent of FIG. 2, according to one embodiment.

The lever detent 20 has an outer surface with a plurality of surface features (e.g., peaks and valleys). For example, the outer surface of the lever detent 20 can include a plurality of sloped sidewalls 24. Two of the sidewalls 24 can come together to form a groove 25, so that the outer surface defines a plurality of grooves 25, each banked by a sloped sidewall 24. Lubricant or grease can be provided in the grooves 25.

Figure 4:
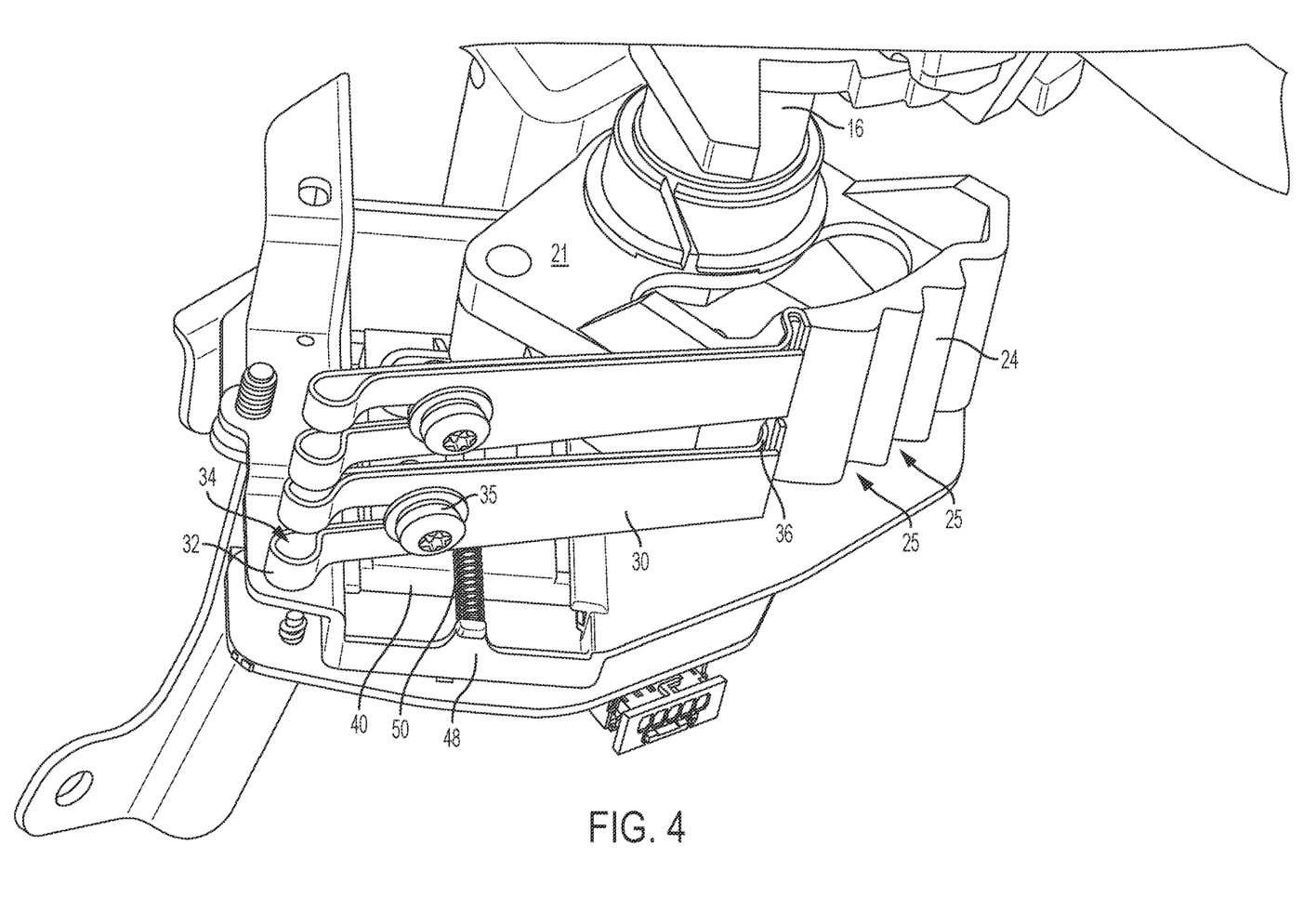
FIG. 4 is a perspective view of another region of the SBW column shifter, highlighting an engagement between the lever detent and leaf springs, according to one embodiment.

The grooves 25 engage with the leaf springs 30 as the lever detent 20 is rotated. As shown in FIG. 4, two generally identical leaf springs 30 can be provided (and therefore only one of the leaf springs will be described to remove redundancy). Each leaf spring 30 can be formed of a single continuous piece of material (e.g., steel, aluminum, etc.) that is bend to shape. Each leaf spring has one end 32 with a groove 34 formed therein to receive a fastener 35 (e.g., screw, bolt, etc.) to mount that leaf spring 30 to the housing (which is not shown for clarity). A second end 36 of each leaf spring 30 is bent, curved, or rounded to shape to facilitate a sliding and pivotal movement along the sidewalls 24.

When the vehicle is operating in a first gear (e.g., PRND), the curved second end 36 is located within one of the grooves 25 of the lever detent 20. During a shift of operating gears, the lever detent 20 rotates, causing deflection or bending of the springs 30 in which the second end 36 of each spring 30 slides along one of the sidewalls 24, radially away from the rotating shaft 16. This bends the spring 30 about the fixed point of attachment (e.g., the fastener 35). The spring bias against the lever detent 20 provides a force or mechanical feedback to the driver, simulating a feel of a resistance force that would otherwise be present in a traditional non-by-wire gear shifter with mechanical linkages. Once the lever detent 20 has been rotated far enough, the springs 30 are able to bend back to their biased position in which the second end 36 returns radially inward to rest within another one of the grooves 25. When in position within one of the grooves 25, the spring 30 maintains the lever detent 20 in a fixed location until another change in operating gear is commanded by the driver.

While a leaf spring is described herein, it should be understood that the present disclosure is not limited to such a particular type of spring. Instead, the spring may be any type of spring that can provide mechanical feedback to the driver by pressing against the lever detent during rotation of the lever detent when shifting gears. For example, the spring may be of the type that compresses and expands in a linear path as the lever detent is rotated.

In one embodiment, the number of grooves 25 in the lever detent 20 can be equal to the number of operating gears (e.g., PRND) available for selection by the driver. For each operating gear selected, the spring 30 is received within a designated groove 25 associated with that selected gear, which maintains the slider magnet 40 to a corresponding designated linear position for that selected gear.

Figure 2:
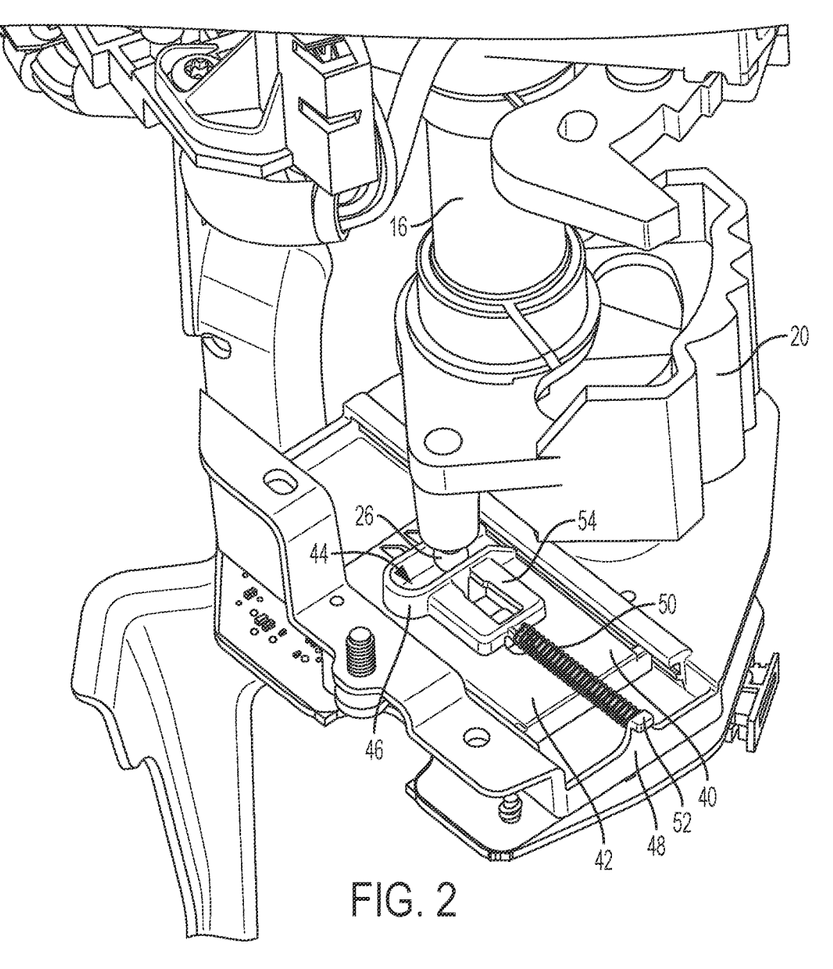
FIG. 2 is a perspective view of a region of the SBW column shifter, highlighting an engagement between a lever detent and a slider magnet, according to one embodiment.

Rotation of the lever detent 20 causes a corresponding linear sliding movement of the slider magnet 40. In one embodiment, the main body 21 of the lever detent 20 has a projection 26 extending therefrom. In one embodiment, the projection 26 is spherical, rounded, or frusto-spherical. The slider magnet 40 has an upper surface 42 facing the lever detent 20. The upper surface 42 has a groove 44 formed therein, which may be defined by or flanked within sidewalls 46 extending upward toward the lever detent 20 to direct movement of the projection 26. The groove 44 is sized and configured to receive the projection 26 in a sliding manner. The groove 44 extends linearly across the width of the slider magnet 40, and creates a linear pathway for the projection 26 to slide within. As the lever detent 20 is rotated, the projection 26 slides within the groove 44. And, the slider magnet 40 is bound to move linearly (e.g., forward and backward) within linearly-extending rails or walls 47 of a slider-magnet housing 48. The slider-magnet housing 48 may be mounted or fixed relative to the housing, such that the slider magnet 40 can slide within the stationary slider-magnet housing 48 during gear shifts. Thus, rotational movement of the lever detent 20 forces the projection 26 to move within the groove 44 of the slider magnet 40, causing the slider magnet 40 to move along a linear pathway. Rotational movement (of the lever detent) is therefore converted into linear movement (of the slider magnet) in this manner.

The slider magnet 40 is referred to as a "magnet" because it is at least partially magnetic. For example, the slider magnet 40 may be entirely made of a ferromagnetic material such as iron, nickel, cobalt, rare-earth metals, etc. In another embodiment, a ferromagnetic material is impregnated or bonded to a base material of the slider, such as aluminum, steel, etc. The slider magnet 40 may also be a multipolar magnet, built from multiple individual magnets, with each individual magnet serving an individual purpose of activating one of the sensors (explained below) when passing by. The slider magnet 40 may also be a single magnet with multiple poles. Furthermore, the use of the term "slider magnet" may also refer to the housing that surrounds or contains the magnet itself.

Figure 5:
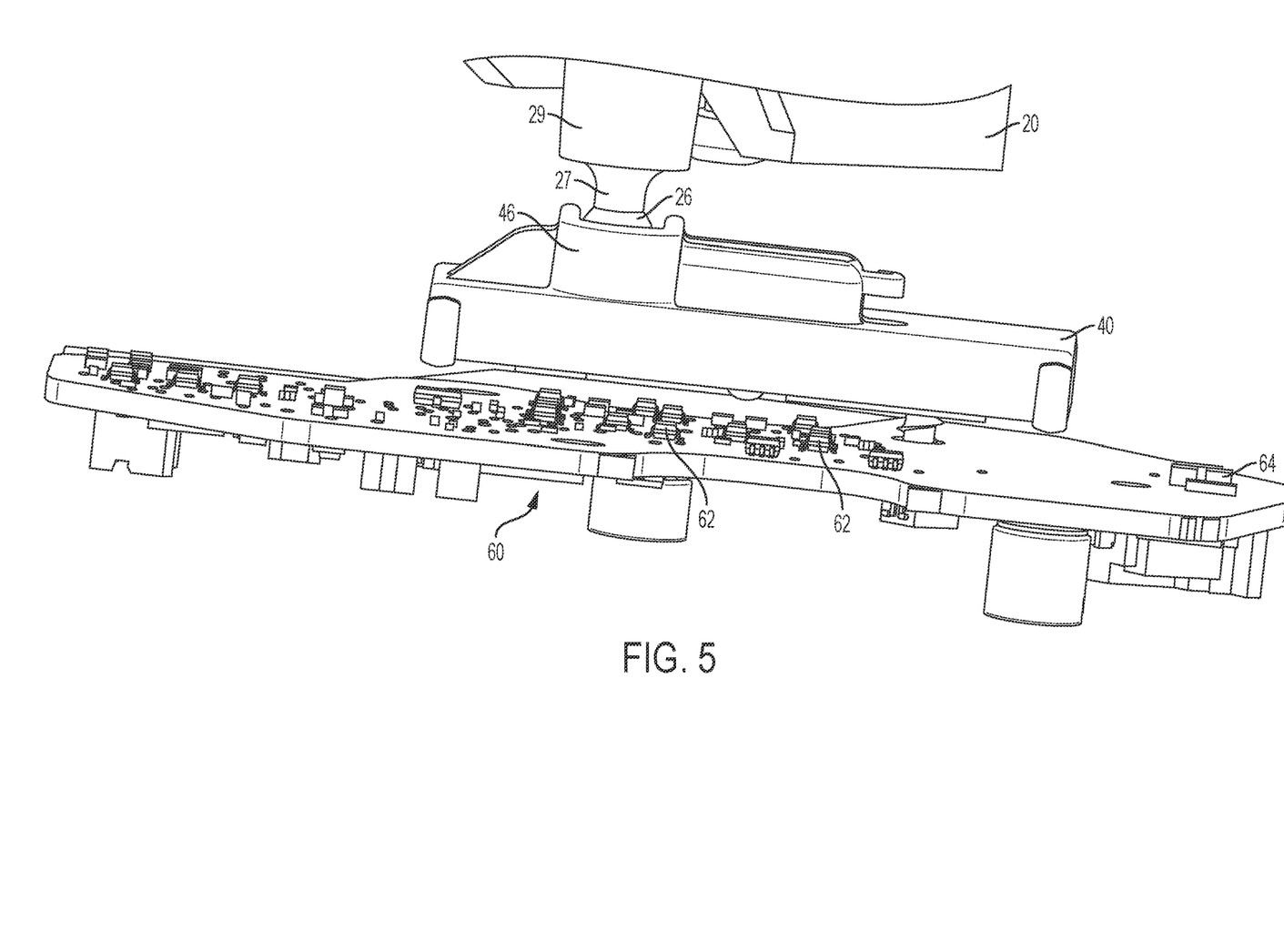
FIG. 5 is a side view of another region of the SBW column shifter, showing the engagement of the lever detent and the slider magnet, with the slider magnet spaced above a plurality of sensors, according to one embodiment.

As can be seen in FIG. 5 for example, a printed circuit assembly (PCA, also referred to as a printed circuit board or printed circuit board assembly) 60 is provided, fixed relative to the housing of the SBW column shifter 10 at a spaced location from the slider magnet 40. The PCA 60 includes a plurality of contactless sensors 62 configured to detect the presence and/or location of the slider magnet 40 by outputting signals in response to the presence of the magnetic field of the slider magnet 40 being aligned therewith. In one embodiment, the sensors 62 are Hall effect sensors each having a transducer that varies its output voltage in response to the magnetic field from the slider magnet 40. In particular, the Hall effect sensors can output a magnetic field that varies in response to a changing proximity of the slider magnet 40; when the magnetic field is increased above a certain low threshold, it can be determined (e.g., via an associated processor or controller) that the slider magnet 40 is in a location aligned with that sensor. The sensors 62 may be located along the linear path that the slider magnet 40 travels along during gear shifts. Thus, when the slider magnet 40 is moved to a particular location when shifting from one operating gear to another, one of the sensors 62 may be deactivated (e.g., magnetic field dropping below the threshold) while another sensor 62 may be activated (e.g., magnetic field increasing above the threshold).

The sensors 62 are coupled to an associated processor, microprocessor, controller or the like (hereinafter referred to as a processor) that can be either on-board the PCA 60 or off-board. In one embodiment, each of the sensors 62 is located at a particular location such that each respective sensor 62 is activated when the slider magnet 40 is in a particular location associated with the shifter 10 being set in a particular operating gear. In another embodiment, multiple sensors 62 may be located intermittently and in various locations, and a pattern of activated sensors indicates the position of the slider magnet 40. For example, when the shifter 10 is in Park, the slider magnet 40 may be located such that a first and a second sensor are activated. When the operator shifts gears to Reverse, the second and a third sensor may be activated while the first sensor is deactivated. Thus, while the second sensor is active for both the Park and Reverse gear selections, the overall pattern of sensor activity can be analyzed by the processor to determine which gear is selected by the driver. It should be understood that this is not limiting but merely an example of the concept of having an individual sensor that could be activated to indicate different gear selections. In other examples, a particular sensor might be activated for one or multiple gear selections including Park, Reverse, Neutral, Drive, Low, etc. The transmission can be commanded to be shifted by the processor accordingly. This operates the "by-wire" nature of the shifter 10.

Figure 6:
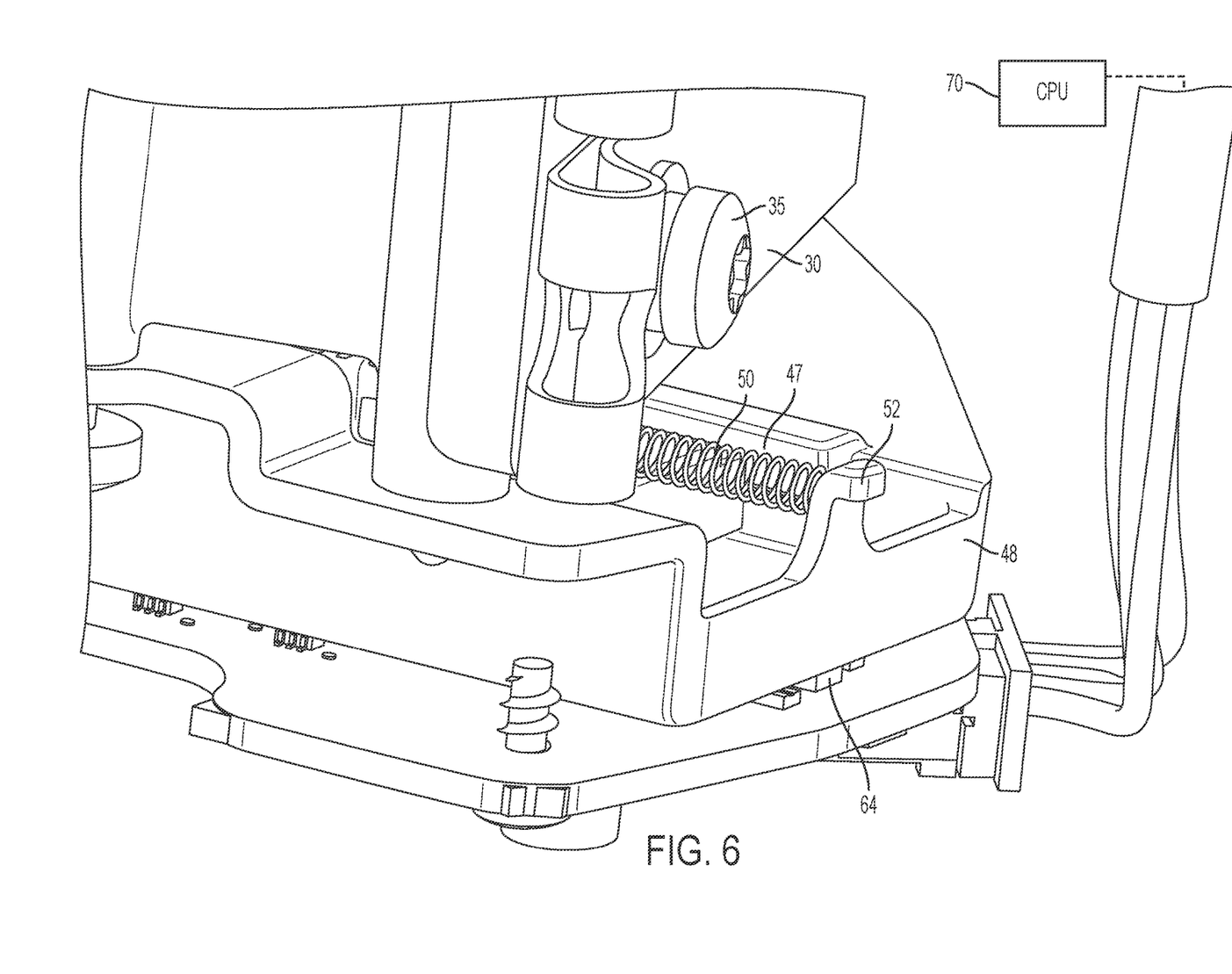
FIG. 6 is a perspective view of another region of the SBW column shifter, showing a portion of one of the clips as well as a spring biasing the slider magnet to a set position, according to one embodiment.

The slider magnet 40 may be spring-biased to slide to a designated position in the event of a failure or break in the connection between the lever detent 20 and the slider magnet 40. For example, if an extremely large force is provided to the shifter 10, mechanical failure in the connection between the projection 26 and the groove 44 of the slider magnet 40 is always a possibility. To account for this possibility, a spring 50 biases the slider magnet 40 toward an end of the slider-magnet housing 48. In one embodiment, a first end of the spring 50 is connected to a tab 52 extending upward from a main tray body of the slider-magnet housing 48, and a second end of the spring is connected to a raised region 54 of the slider magnet 40. In the event of such an aforementioned mechanical failure in the connection at the projection 26 and groove 44, the spring 50 pulls the slider magnet 40 to a position that may only be attainable during such a failure. In other words, the slider magnet 40 slides to a linear position that it would not otherwise be able to slide to during normal shifting between gears. An associated sensor 64 (that can be a Hall effect sensor like the other sensors 62) can be located at a position such that it is activated when the slider magnet 40 is pulled to the designated position via the spring 50. That sensor 64 outputs a signal in response to the slider magnet 40 being in its designated position associated with a failure or break in the connection between the lever detent 20 and the slider magnet 40. The associated processor can infer from receiving a signal from the sensor 64 that such a mechanical failure or break has occurred, and can output a corresponding alert (e.g., video, audio, etc.) alerting the driver of a failure in the shifter 10. Alternatively, the alert can be a signal sent to an on-board diagnostic (OBD or OBD-II) port for a technician to diagnose the signal and determine that a failure in the shifter 10 has occurred.

To facilitate the proper movement of the slider magnet 40 in the event of such a mechanical failure, the lever detent 20 is provided with a region of thinned or weakened material. For example, the projection 26 may include a detent shaft 27, with the spherical or frusto-spherical region extending from the detent shaft 27. The detent shaft 27 may also be another shape, such as cylindrical. The detent shaft 27 may extend from a larger shaft 29 that has a diameter that exceeds that of the detent shaft 27. In the event of an extremely large force being applied to the lever detent, the break between the lever detent 20 and the slider magnet 40 may be concentrated at the detent shaft 27 to facilitate the break, allowing the slider magnet 40 to cleanly break away from the lever detent 20 and slide to its designated position aligned with the sensor 64.

FIG. 6 shows a processor or CPU 70 that is connected via wires 72 and a wire connection 74 to the PCA 60 and associated sensors. It should be understood that the CPU 70 may also be located directly on-board the PCA 60. In one embodiment, the CPU 70 is responsible for receiving the signals output from the sensors 62, 64, processing those signals, and commanding the shift in operating gears described above. As such, the CPU 70 can be coupled to a transmission control unit (TCU), powertrain control unit (PCU), or the like that is responsible for commanding the shift in operating gears. The CPU 70 can be provided with or be in communication with a storage medium that associates activated sensors with an operating gear that should be selected.

Figure 7A:
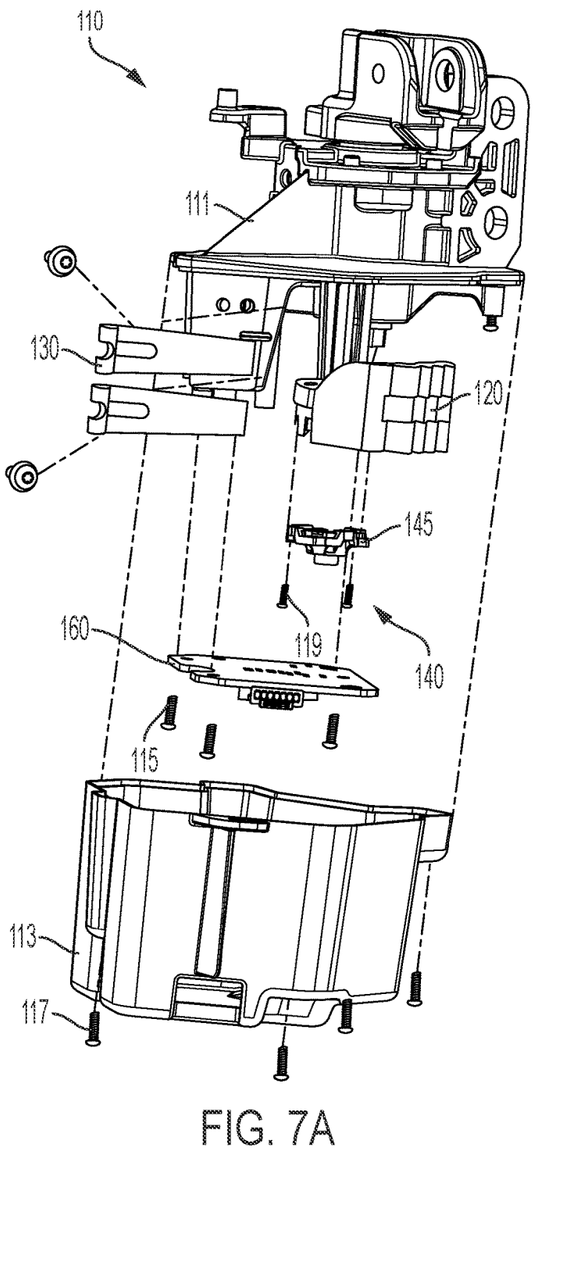
FIG. 7A is an exploded perspective view of a region of an SBW column shifter according to another embodiment comprising a rotational position sensor assembly.

FIG. 7 illustrates an SBW column shifter 110 according to another embodiment with certain associated reference numbers increased by 100 relative to the embodiment shown in FIGS. 1-6. Once again, the SBW column shifter 110 of this embodiment includes a lever detent 120, one or more leaf springs 130, and a printed circuit assembly (PCA) 160. However, in this embodiment, no slider magnet is provided. Instead, a rotational position sensor assembly 140 is provided for sensing the rotational position of the lever detent 120, and thus the relative position of the shift lever 12 and the desired operating gear (e.g., park, reverse, neutral, drive, etc.).

The lever detent 120 may be coupled to a shaft in similar fashion as the previous embodiments described such that the lever detent 120 rotates as the shift lever 12 is pulled to rotate the shaft. As the lever detent 120 is rotated, the leaf springs 130 engage corresponding sidewalls and grooves of the lever detent in each selected operating gear. In general, as the lever detent is rotated between each operating gear, the rotational position sensor assembly 140 detects the rotational position of the lever gear and thus the selected gear; a processor (e.g., on-board the PCA 160 or off-board)

can command an operating gear change based on the output of the rotational position sensor assembly 140.

The SBW column shifter 110 also includes a housing 111 connected to a PCA cover 113 to contain or house the PCA and associated components therein. The PCA 160 may be fixed to the housing 111 via fasteners 115, and the PCA cover 113 may be fixed to the housing 111 via fasteners 117. Similar structure may also be implemented in the other embodiments described herein.

Figure 7B:
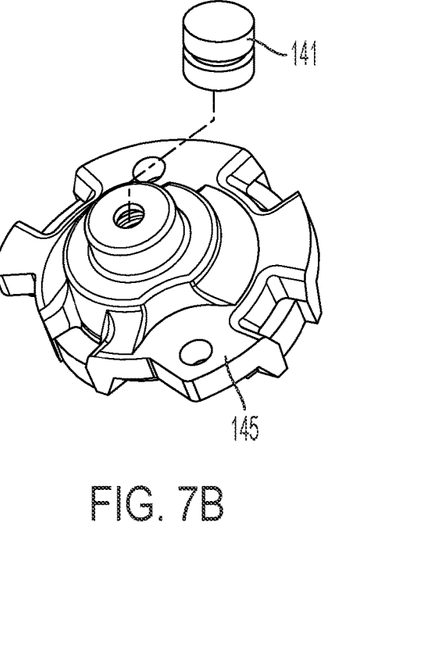
FIG. 7B is an exploded perspective view of a detection cap and magnet of the rotational position sensor assembly, according to an embodiment.
Figure 7C:
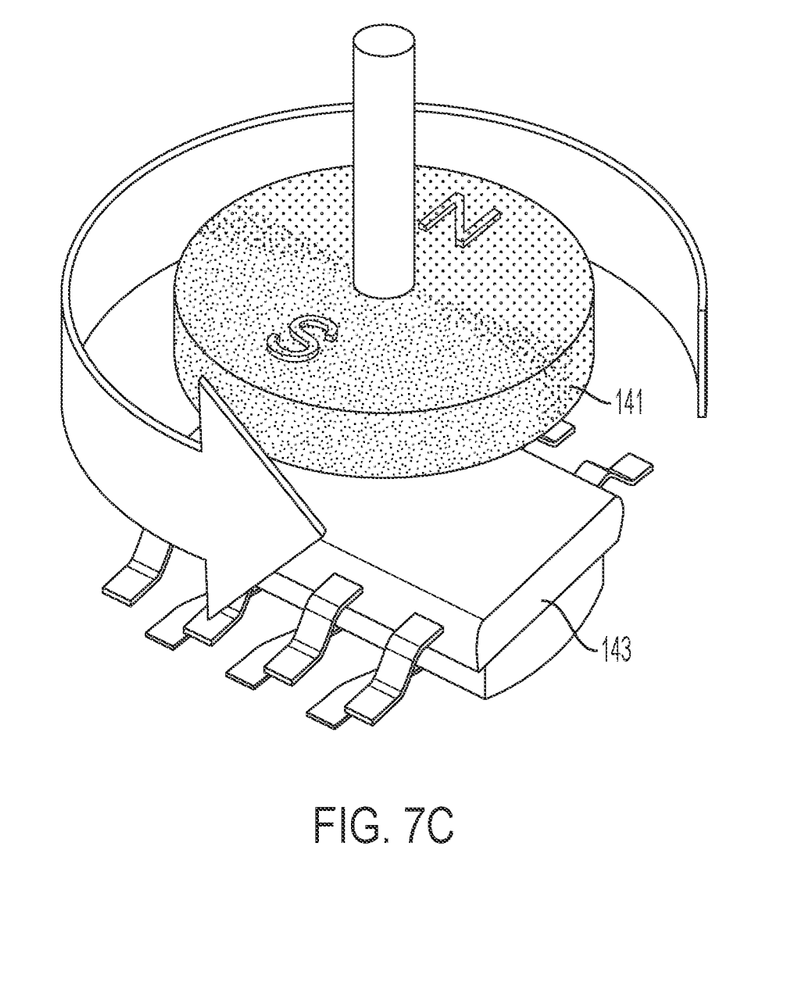
FIG. 7C is a generalized schematic of the rotational position sensor assembly, specifically the magnet and the sensor, according to an embodiment.

Referring to FIGS. 7A-7C, the rotational position sensor assembly 140 is generally comprised of a magnet 141, a detection cap 145, and a sensor 143, along with the lever detent 120 and the PCA 160. The sensor 143 may be placed on or part of the PCA 160 (e.g., on the printed circuit board). When assembled, the magnet 141 may be spaced from the PCA 160 at a location vertically aligned with the sensor 143. This is an "on-axis" location, although in other embodiments the rotational position sensor assembly may include an "off-axis" sensor in which the sensor is not coaxial with the rotational point of the magnet. In an embodiment, the magnet 141 is housed within the detection cap 145 that is fixed to the lever detent 120 via fasteners 119. The magnet 141 can be aligned with the axis of rotation such that as the gear lever is shifted, the magnet 141 rotates about a fixed central point.

The magnet 141 and sensor 143 cooperate to sense rotation. The relationship between the magnet 141 and the sensor 143 is shown generally in FIG. 7C. In short, the sensor 143 senses changes in the magnetic characteristics of the magnet 141 as the magnet 141 rotates, and outputs a signal that corresponds to the rotational position of the magnet 141 based on the detected magnetic characteristic. There are various ways to accomplish this. For example, the strength of the magnetic field can be sensed by the sensor 143, and the corresponding strength can be programmed or calibrated to a specific angular position of the center shaft, and thus a specific operation gear selection. The sensor 143 may be a sensor in the model line MLX by MELEXIS, or an AS5030 (or similar model of angle position on-axis sensor) by AMS, for example. These are merely examples of sensors that can detect a change in the rotational position of the magnet due to the changes in the polarity position, magnetic field strength, and the like.

The magnet 141 may be overmolded or otherwise secured to the detection cap 145. Overmolding of the magnet 141 can help secure the magnet 141 within the synthetic material of the detection cap 145 without interfering with the magnetic flux or properties of the magnet 141.

Based on the detected angular position of the magnet 141, the sensor 143 can output a signal to activate a by-wire change in the selected operating gear of the vehicle. In other words, each detected angle of rotation of the magnet can be calibrated to match a corresponding operating gear selection. This is shown generally in FIGS. 8A-8D, which shows a bottom view of the SBW column shifter 110 with the printed circuit board removed for clarity of view.

Figure 8A:
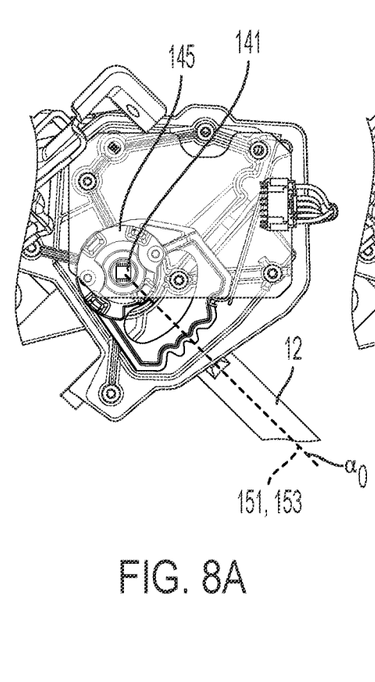
FIGS. 8A-8D are top plan views of the SBW column shifter of FIG. 7A in various rotational positions as the column shifter is shifter is shifted into various operating gears (e.g., PRND), according to an embodiment.
Figure 8B:
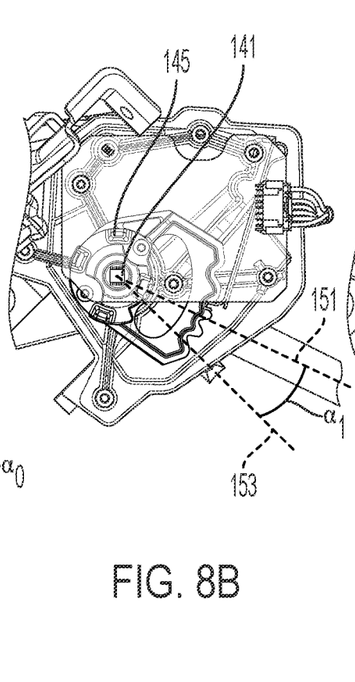
Figure 8C:
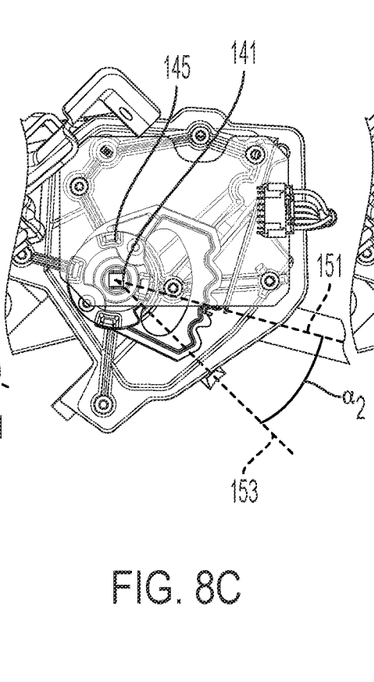
Figure 8D:
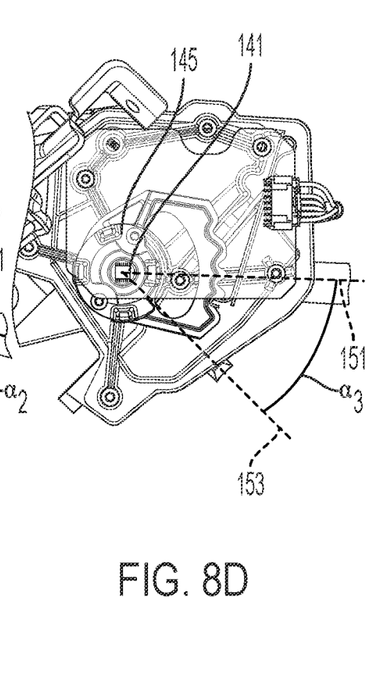

FIGS. 8A-8D show the use of the SBW column shifter 110 as the shift lever 12 is pulled or rotated to select different operating gears. FIG. 8A shows the SBW column shifter 110 in a Park position, FIG. 8B shows the SBW column shifter 110 in a Reverse position, FIG. 8C shows the SBW column shifter 110 in a Neutral position, and FIG. 8D shows the SBW column shifter 110 in a Drive position.

In the Park position of FIG. 8A, an axis 151 of the shift lever 12 is aligned with a zero position 153, such that the angle between the axis 151 and the zero position 153 is $\alpha_0=0$. At this location, the sensor 143 detects the magnetic characteristics of the magnet 141, and correspondingly commands a Park gear to be engaged. Once the shift lever 12 is in the Park position, the PCA 160 can send a signal to the vehicle ECU, ECM or directly to the transmission (not shown) that the start key or start button can be activated. In typical vehicles, a mechanical linkage is present between the Park position and the ability to start the vehicle via key or button, such that the vehicle can only be started when the shift lever is in the Park position due to mechanical constraints. The arrangement and use of the PCA 160 along with the magnet 141 can remove this mechanical linkage between the Park position and a start key or start button, allowing for the removal of parts. Likewise, a mechanical linkage is typically present between the Park position and the ability to turn the vehicle off via key or button, such that the vehicle can only be turned off when the shift lever is in the Park position due to mechanical constraints. The arrangement and use of the PCA 160 along with the magnet 141 can remove this mechanical linkage between the Park position and the key-off button or key position, allowing for removal of parts.

In the Reverse position of FIG. 8B, the shift lever 12 and connected detection cap 145 with magnet 141 have been rotated relative to the sensor 143 on the printed circuit board (not shown) to a position such that the angle between the axis 151 and the zero position 153 is a first angle $\alpha_1>\alpha_0$. The processor connected to the sensor 143 can be programmed to command a Reverse operating gear when the detected angle is equal to (or within a threshold of) $\alpha_1$.

In the Neutral position of FIG. 8C, the shift lever 12 and connected detection cap 145 with magnet 141 have been rotated relative to the sensor 143 on the printed circuit board (not shown) to a position such that the angle between the axis 151 and the zero position 153 is a second angle $\alpha_2>\alpha_1$. The processor connected to the sensor 143 can be programmed to command a Neutral operating gear when the detected angle is equal to (or within a threshold of) $\alpha_2$.

In the Drive position of FIG. 8D, the shift lever 12 and connected detection cap 145 with magnet 141 have been rotated relative to the sensor 143 on the printed circuit board (not shown) to a position such that the angle between the axis 151 and the zero position 153 is a third angle $\alpha_3>\alpha_2$. The processor connected to the sensor 143 can be programmed to command a Park operating gear when the detected angle is equal to (or within a threshold of) $\alpha_3$.

It should be understood that there could be more than just the four standard PRND positions. For example, in other embodiments, there can be one or more of the following shift positions: first drive (D1), second drive (D2), manual (M), low (L) positions. Any one or more of these additional shift positions can also be calibrated such that a detected rotational position of the magnet 141 can correspond to a respective one of these additional shift positions. In short, the teachings of this disclosure should not be limited to just Park, Reverse, Neutral, and Drive.

The technology described above with reference to at least the embodiment of FIGS. 7-8 has the capability to send signals via CAN bus or LIN bus to the vehicle's transmission control unit to inform the transmission control unit that the vehicle is either in Park position or out of Park position. Certain features of the vehicle can be utilized only when the transmission is in Park or is out of Park, and this feature can provide such a signal. For example, when $\alpha_0=0$, a signal can be sent that the vehicle is in park, and thus enabling features (e.g., automatically unlocking doors, as one of many examples). This can eliminate the need for a separate sensor that determines that the vehicle is in park, or the technology disclosed herein can be used as a redundancy safety mechanism.

While illustrated as one processor 70, the CPU may be part of a larger control system and may be controlled by various other controllers throughout the vehicle, such as a vehicle system controller (VSC). It should therefore be understood that the CPU 70 and one or more other controllers responsible for receiving signals from the PCA 60 and commanding the associated shift in operating gears can collectively be referred to as a "controller". The controller may include a microprocessor or central processing unit (CPU) in communication with various types of computer readable storage devices or media. Computer readable storage devices or media may include volatile and non-volatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices, such as PROMs (programmable read-only memory), EPROMs (electrically PROM), EEPROMs (electrically erasable PROM), flash memory, or any other electric, magnetic, optical, or combination of memory devices capable of storing data, some of which represent executable instructions, used by the controller in controlling the engine or vehicle.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media, such as ROM devices, and information alterably stored on writeable storage media, such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A shift-by-wire (SBW) column shifter configured to mount to or within a steering column of a vehicle, the SBW column shifter comprising:
    a shift lever configured to be moved to shift gears;
    a shaft coupled to the shift lever to enable the shift lever to rotate the shaft about an axis;
    a lever detent coupled to the shaft to enable the shaft to rotate the lever detent about the axis;
    a magnet configured to rotate about the axis as the shift lever is moved between gears; and
    a sensor configured to output signals indicating an angular position of the magnet, wherein the signals are indicative of a command to change an operating gear of the vehicle,
    wherein the magnet is attached to a cap that is secured to an outer surface of the lever detent such that the cap rotates as the lever detent rotates about the axis.

2. The SBW column shifter of claim 1, wherein the lever detent has an outer surface with a plurality of ramped walls located between respective grooves.

3. The SBW column shifter of claim 2, further comprising a spring having a rounded free end configured to provide a force against the ramped walls as the lever detent is rotated and configured to maintain the lever detent in a position when the lever detent is not rotated.

4. The SBW column shifter of claim 3, wherein the spring is a first leaf spring, the SBW column shifter further comprising a second leaf spring configured to provide a force against the ramped walls in the event of a failure of the first leaf spring.

5. The SBW column shifter of claim 3, further comprising a housing having an aperture extending therethrough that receives the shaft, the shaft being rotatable within the aperture and relative to the housing, wherein the spring is mounted to the housing.

6. The SBW column shifter of claim 1, wherein the sensor is fixed at a location spaced from the magnet along the axis, and the magnet rotates relative to the sensor.

7. The SBW column shifter of claim 1, wherein the magnet is connected to the cap via an overmold.

8. A shift-by-wire (SBW) column shifter configured to mount to or within a steering column of a vehicle, the SBW column shifter comprising:
    a housing;
    a lever detent rotatable within the housing in response to a shift lever moving to command a gear shift, the lever detent having an outer surface with a plurality of ramped surfaces leading to respective grooves therebetween;
    a spring mounted to the housing, the spring having a free end biased against the outer surface of the lever detent, wherein the free end slides along the ramped surfaces and presses into the grooves as the lever detent rotates during the gear shift;
    a controller programmed to command a change in an operating gear as the lever detent rotates, wherein each of the grooves is associated with a respective one of the operating gears; and
    a rotational position sensor assembly configured to output a signal that changes as the lever detent rotates, wherein the controller is programmed to command the change in the operating gear based on the signal, wherein the rotational position sensor assembly includes a cap secured to the lever detent, and a magnet secured to the cap such that the magnet rotates as the lever detent rotates.

9. The SBW column shifter of claim 8, wherein the spring has a spring biasing force to maintain a selected gear and to inhibit the lever detent from rotating without the shift lever moving.

10. The SBW column shifter of claim 8, wherein the spring is mounted to the housing at an attachment point, and the spring is configured to bend about the attachment point as the free end slides along the ramped surfaces.

11. The SBW column shifter of claim 8, further comprising a sensor aligned with the magnet along an axis, wherein the magnet rotates relative to the sensor about the axis as the lever detent rotates about the axis.

12. The SBW column shifter of claim 11, wherein the controller is programmed to command the change in the operating gear based on changes in magnetic characteristics of the magnet as the magnet rotates.

13. A vehicle shift-by-wire (SBW) system comprising:

a lever detent rotatable about an axis in response to a shift lever moving to command a gear shift, the lever detent having an outer surface defining a plurality of ramped surfaces leading to respective grooves therebetween, the lever detent further having a main body with a projection extending therefrom at a location offset from the axis;

a spring having a free end engaging the outer surface of the lever detent, the spring configured to slide along the ramped surfaces and mate within the grooves as the lever detent rotates to provide a force feedback to an operator during shifting;

a cap secured to an outer surface of the lever detent;

a magnet secured to the cap and rotatable about the axis as the lever detent rotates about the axis;

a sensor fixed along the axis and spaced from the magnet, the sensor configured to output a signal that changes in response to rotation of the magnet; and a controller coupled to the sensor and programmed to command the gear shift in response to a change in the signal.

14. The vehicle SBW system of claim 13, wherein the magnet is overmolded to the cap.

15. The vehicle SBW system of claim 13, wherein the signal from the sensor indicates an angular position of the magnet.

16. The vehicle SBW system of claim 15, wherein the controller is programmed to command the gear shift in response to the angular position of the magnet being within a threshold of an angle associated with a different gear than what is currently selected.

17. The vehicle SBW system of claim 16, wherein the cap is fixed to the lever detent such that the cap rotates with the lever detent about the axis.

\* \* \* \* \*